Patented Sept. 8, 1942

2,295,256

UNITED STATES PATENT OFFICE 2,295,256

PROCESS AND DEVICE FOR FRACTIONAL DISTILLATION OF LIQUID MIXTURES, MORE PARTICULARLY PETROLEUM

Antoine Johan Brugma, The Hague, Netherlands

Continuation of application Serial No. 113,596, December 1, 1936. This application August 23, 1940, Serial No. 353,788. In the Netherlands January 30, 1936

6 Claims. (Cl. 196—73)

This invention relates to the fractional distillation of composite fluids such as hydrocarbon oils and the like.

This application is a continuation of application Serial No. 113,596, filed December 1, 1936.

The invention provides a novel method and novel apparatus for accurately separating the components of a composite fluid without the necessity of utilizing stripping of intermediate fractions. For example, the practice of the invention makes it possible to obtain four closely fractionated products from a feed stream by using two towers only with no side stream strippers, and to obtain eight closely fractionated products by using three towers only with no side stream strippers. Use of the invention results in a saving in ground space and in first cost of the equipment.

In carrying out the invention, a single feed stream is introduced into a first fractionating tower wherein the feed is substantially completely fractionated into two non-overlapping fractions, after which these two fractions are introduced into a second fractionating tower at spaced points, and two substantially non-overlapping fractions are removed from the second tower at points intermediate the points at which the two fractions from the first tower are introduced into the second tower in addition to the overhead and bottoms streams from the second tower. If desired, the two overlapping fractions removed from the second tower may be introduced into a third tower together with the overhead and bottom streams from the second tower. From the third tower, two well fractionated streams are removed intermediate the points of introduction of each pair of feed streams to the third tower, in addition to the overhead and bottom streams from the third tower.

It is well known that in the operation of a fractionating or rectifying column, each tray above the point of feed will contain liquid which is richer in light constituents of the feed material and is poorer in heavy constituents than the liquid on the tray or trays at a lower elevation. In consequence, it has been possible to obtain one or more fractions of intermediate composition from the column by withdrawing liquid from one or more of the trays of the column. This method however, is disadvantageous because the intermediate fractions thus obtained will contain as impurities all the constituents from the top fraction if the tray or trays from which liquid is withdrawn are located above the feed point to the column, whereas these intermediate fractions will contain constituents of the bottom fraction if the tray or trays from which the liquid is withdrawn are located below the feed point. This is due to the fact that all the constituents of the top fraction which are in vapor form, in flowing from the point of feed to the condenser must pass through the liquid on the trays above the point of feed so that on each of these trays the vapor and liquid will be in approximate equilibrium and the constituents of the top fraction will be present in the liquid in a certain ratio. This is also true of the liquid withdrawn from the trays disposed below the point of feed so far as the constituents of the bottom fraction are concerned. It is not possible therefore, to obtain intermediate fractions from fractionating columns utilized heretofore which do not overlap each other at all or only to a very slight degree with regard to the boiling points of their constituents, which means that redistilling will often be needed which will necessitate extra apparatus, fuel, tank space and labor.

These disadvantages of prior fractionating methods are overcome by the present invention. Fractions withdrawn from the trays of fractionating columns arranged and operated in accordance with the invention will not overlap each other at all, or will only overlap each other to a very slight degree.

The invention will be understood from the following description considered in connection with the accompanying drawings forming a part thereof, and in which.

Like characters of reference refer to the same or to similar parts throughout the several views.

Figure 1:
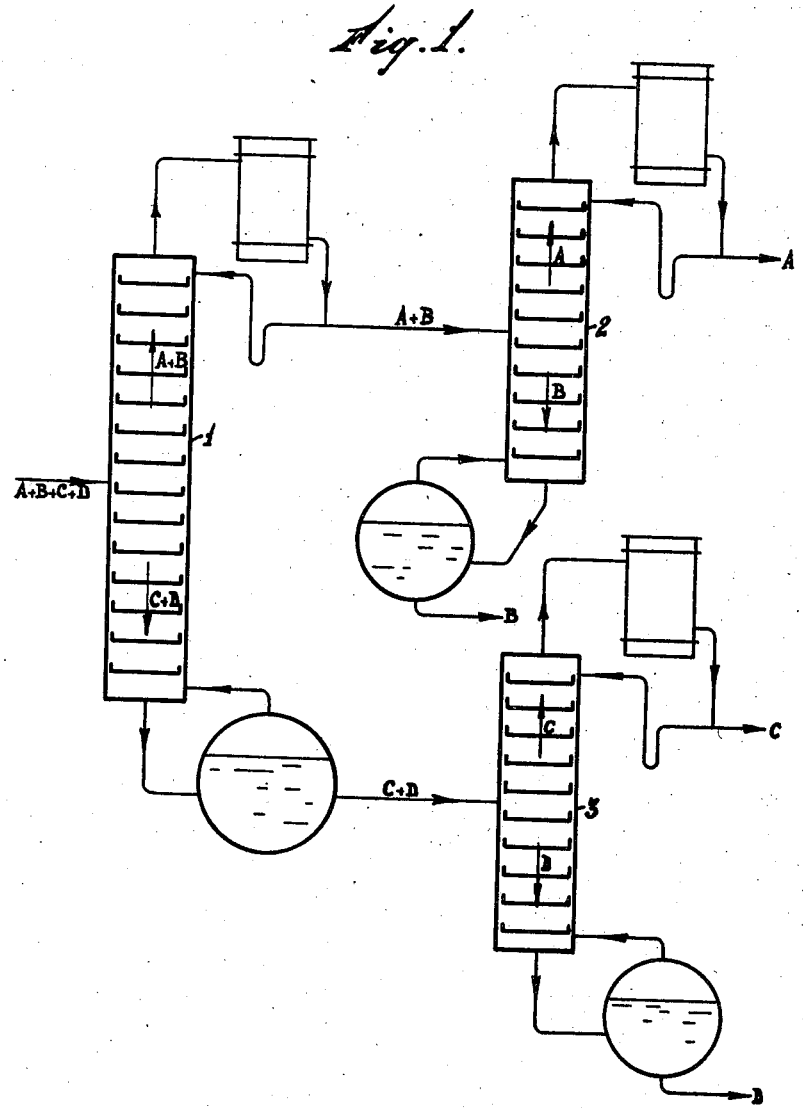
Fig. 1 is a diagrammatic view showing fractionating apparatus illustrating a conventional distillation method.
Figure 2:
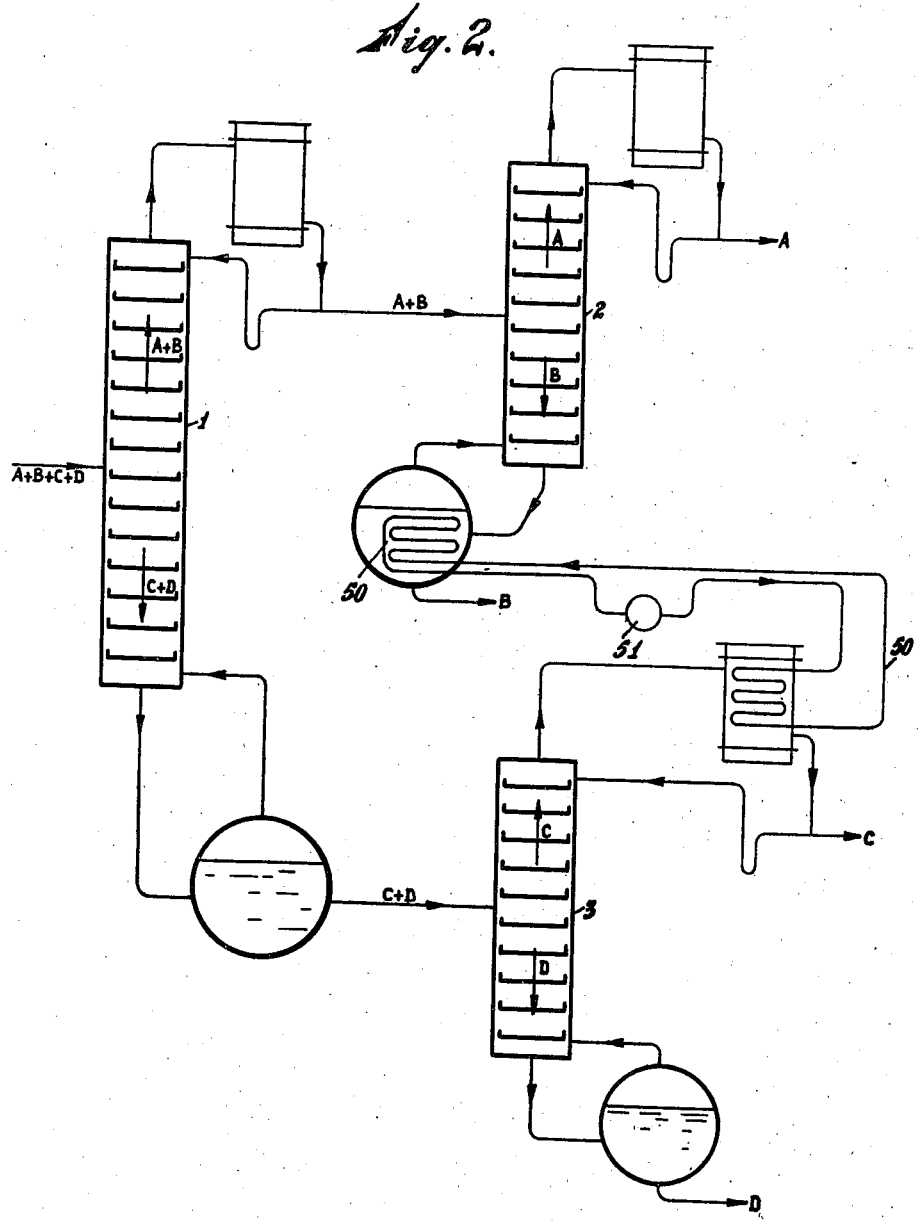
Fig. 2 is a view similar to Fig. 1, but showing a form of apparatus illustrating the principles of the invention.

Referring to the drawings, particularly Figs. 1 and 2, reference character 1 designates a single fractionating column or tower into which composite fluid, such as hydrocarbon oil or the like, is introduced onto one of the intermedite trays of the column, the fluid so introduced or the feed, containing for example fractions A, B, C and D. Within the column 1, the feed will be completely separated into a top fraction $A+B$ and a bottom fraction $C+D$ provided the tower is operating in an ideal manner, so that the top and bottom fractions will not overlap each other. These two fractions, $A+B$ and $C+D$, are then introduced into two other fractionating columns or towers 2 and 3, with the result that each of these fractions is completely separated into two fractions A and B, C and D respectively, which fractions do not or need not overlap each other. If desired, each of the fractions A, B, C and D may further be separated into two fractions in succeeding towers or columns in the same manner that the feed material is separated in the columns 2 and 3, and the fractionation may continue in this manner through succeeding columns as far as is practically possible.

It is possible to arrange the columns 2 and 3 one above the other and to heat the still of the upper column 2, by means of the condenser of the lower column 3, so that the amount of heat applied to the column 3 will serve for both columns with the result that both columns will consume about one-half of the amount of heat and cooling water needed for the fractionating apparatus shown in Fig. 1. Such an arrangement is illustrated in Fig. 2, which shows the same fractionating apparatus as shown in Fig. 1, with the exception that a two coil circulating system 50 is provided in which a heat transferring fluid is circulated by a pump 51. One of the coils is disposed in the condenser of the lower column 3, and the other coil is located in the still of the upper column 2, so that the still is heated by heat transferred from the condenser of the lower column 3. In the same manner, the four columns which receive the four fractions A, B, C and D, may be placed one above the other, so that the amount of heat and cooling water will serve for all four columns. This arrangement may be carried on to the extent of the fractionation desired.

In lieu of supplying to a still the heat from the condenser for the column disposed below, the still and condenser may be removed and the adjacent superimposed columns may be connected with an intermediate fractionating column thereby obtaining a single column having a height equal to the height of the two original columns and the height of the intermediate or connecting column. The intermediate column will convey the heat unwardly therethrough and at the same time will maintain the difference in composition between the liquids on the trays above and below the intermediate column. In this manner the still and condenser are replaced by the top and the bottom trays of the intermediate or connecting column, from which trays the corresponding fractions are withdrawn from the fractionating column.

Inasmuch as the temperature in the condenser of column 3 of Fig. 1, will be higher than the temperature in the still of column 2 of Fig. 1, it will be possible to heat the still of column 2 by means of the condenser of column 3, thereby conveying the heat supplied to the still of column 3 successively through the columns 3 and 2 and to deliver the heat to the cooled water of the condenser of column 2. Assuming that columns 2 and 3 consume substantially equal amounts of heat and together consume an amount of heat equal to that consumed by column 1, this arrangement will effect a saving of approximately one-fourth of the fuel and cooling water. This result however, may be obtained also by omitting the condenser of column 3 and the still of column 2, and connecting these columns by means of a similar column, whereby they are combined into one column. The intermediate portion of this one column will then serve as a heat transmitter in the manner hereinbefore described.

Figure 3:
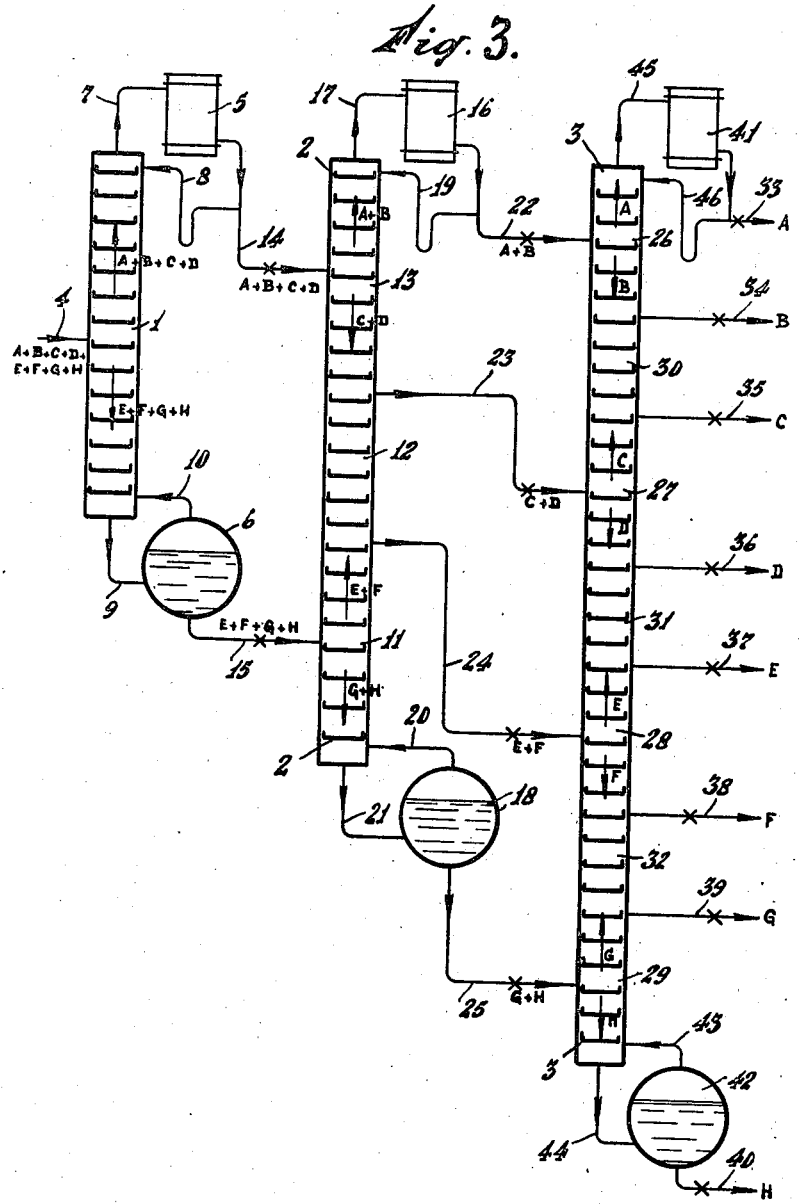
Fig. 3 is a diagrammatic view illustrating one form of apparatus embodying and operated in accordance with the invention.

An arrangement of this character is shown diagrammatically in Fig. 3. Referring to that figure, the fluid mixture which is to be separated into fractions A, B, C, D, E, F, G and H, is introduced through feed line 4 into the fractionating column 1 of any desired type. Column 1 is provided at the time with a condenser 5 and at the bottom with a still 6. Vapor is conducted from the column to the condenser 5 through line 7 and reflux is returned to the top of the tower through line 8. Bottoms are conducted from the column to the still 6 through line 9 and vapor is returned to the bottom of the column from the still through line 10. In column 1 the feed liquid is separated in a practically perfect manner into a fraction $A+B+C+D$ which is withdrawn from the condenser 5 through line 14, and a fraction $E+F+G+H$ which is collected in the still 6 and discharged therefrom through line 15.

Fractionating column 2 consists essentially of two fractionating columns 11 and 13 which are connected by a heat transmitting column 12. To the upper column 13 is connected line 14 and to the lower column is connected line 15. Column 2 is provided with a condenser 16 to which vapor is conducted through line 17 and from which reflux is returned to the top of the column through line 19. Column 2 is also provided with a still 18 to which bottoms are conducted through line 21 and from which vapor is conducted to the bottom of column 2 through line 20. In column 2, the fraction $A+B+C+D$ which is introduced into the upper portion 13 of the column 2, is separated in a practically perfect manner into two fractions, consisting respectively of $A+B$ and $C+D$, and the fraction consisting of $E+F+G+H$ which is introduced into the lower portion 11 of column 2, is separated in a practically perfect manner into two fractions consisting respectively of $E+F$ and $G+H$. The fraction $A+B$ is conducted to the condenser 16 and is withdrawn therefrom through line 22, and the fraction $G+H$ is conducted to still 18 from the bottom of the column and is withdrawn therefrom through line 25. The fraction $C+D$ is withdrawn through line 23 which is connected to the column 2 at a point above the heat transmitting portion 12 of the column, and the fraction $E+F$ is withdrawn from the column through line 24 which is located below the heat transmitting portion 12.

The column 3 consists essentially of four fractionating columns 26, 27, 28 and 29 and three heat transmitting portions 30, 31, and 32, and is provided with a still 42 and connecting lines 43 and 44, and a condenser 41 with connecting lines 45 and 46. Connected with the column 3 are the discharge lines 22, 23, 24 and 25 of column 2 and the associated equipment, which constitute feed lines for the column 3. Column 3 and its associated equipment including condenser 41 and still 42, are provided with eight discharge lines or outlets for the practically pure fractions A, B, C, D, E, F, G and H, said discharge lines or outlets being designated 33, 34, 35, 36, 37, 38, 39 and 40 respectively.

Should it be desired to separate the initial feed stock into a greater number of fractions than eight, another fractionating column similar to column 3, may be utilized with the discharge lines of column 3 connected thereto as feed lines, and having sixteen discharge lines, such other column operating in the same manner as columns 2 and 3. Also if desired, one or more of the fractions withdrawn from columns 2 or 3 may be conducted to a point of use rather than being introduced into a succeeding column, or such withdrawn fractions may be separated otherwise individually into two or more fractions. Pumps or control valves or both may be provided in the connecting lines between the several columns.

Obviously the apparatus in which the process is carried out, may be provided with any equipment for promoting good distillation, economical heating and so forth, such for example as heat exchangers, preheaters and so forth, while a pretreating device for the feed stock may be employed in connection with the apparatus, such as a tube still with a vaporizer for separating the residue, or equipment for after treatment or distillation of one or more of the fractions may be utilized. The stills, columns and condensers may be of different arrangements and may be interconnected differently.

It will be understood that the invention may be carried out in two columns, such as in columns 1 and 2 of Fig. 3, or in more than three columns which are arranged in the manner illustrated in Fig. 3.

Figure 4:
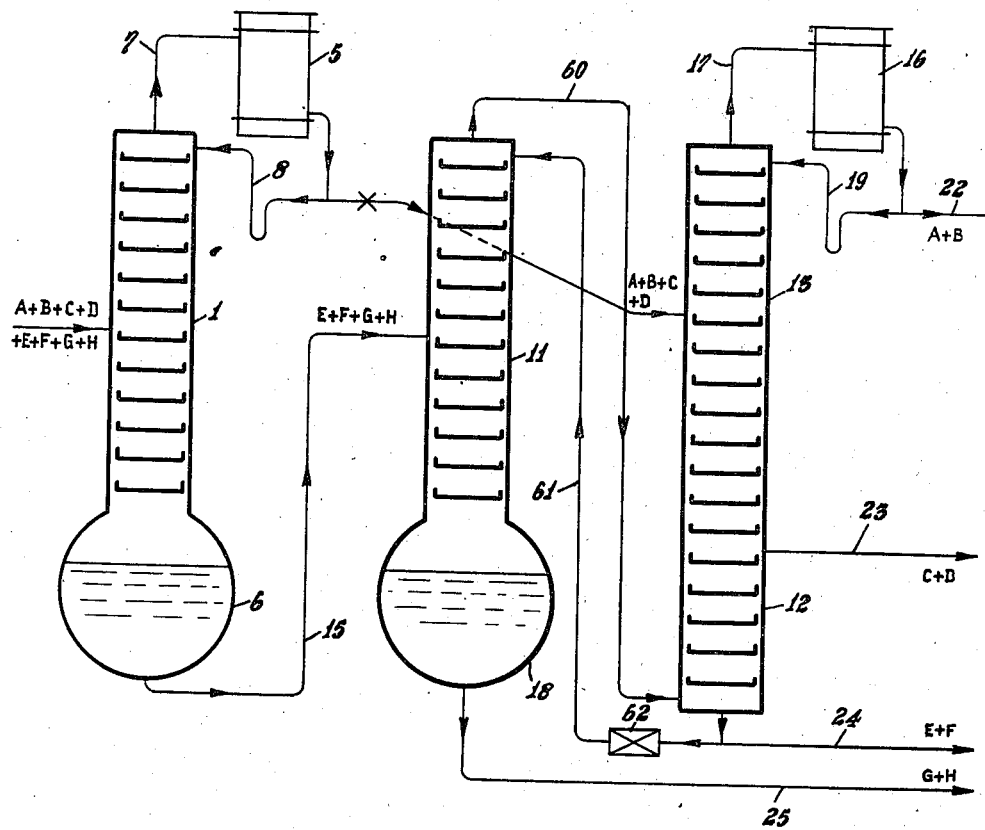
Fig. 4 is a diagrammatic view showing another form of apparatus embodying and operated in accordance with the invention.

Another form of apparatus for carrying out the invention is shown in Fig. 4. This apparatus is the equivalent of columns 1 and 2 and the associated equipment of Fig. 3, excepting that column 2 is divided into two parts which are placed side by side. Column 11 in Fig. 4 is the equivalent of section 11 of column 2 of Fig. 3, and the column consisting of the sections 12 and 13 in Fig. 4 is the equivalent of sections 12 and 13 of column 2 of Fig. 3. Vapor line 60 connects column 11 with section 12 in Fig. 4, and a liquid line 61 having a pump 62 therein connects the bottom of section 12 with the upper part of column 11. Such an arrangement does not alter the principles of the invention because the fractionating zone and tower are merely divided into two or more parts which function as a single fractionating zone or tower. Hence in the foregoing description and in the claims, where it is stated that fractions are introduced at two successive points into a fractionating tower or zone, it will be understood that either an undivided or a divided fractionating tower or zone is meant. For example in Fig. 4, the fractions $A+B+C+D$ and $E+F+G+H$ are introduced into the fractionating zone at two successive points, since column 12, 13 in Fig. 4 constitutes a continuation of column 11, inasmuch as these two columns 11 and 12, 13 together form only one fractionating zone to which heat is supplied by still 18 and from which heat is withdrawn in condenser 16.

As previously mentioned, the advantages of the invention include economy of heat and cooling water due to the utilization of the same quantity of heat and cooling water for a multiple fractionation, and the sharply defined separation in which the fractions obtained do not overlap at all or overlap only to a very slight extent.

It will be understood that changes may be made in the form, location and relative arrangement of the several parts of the apparatus disclosed, and changes may be made in the sequence of the several steps of the process, without departing from the principles of the invention, wherefore the invention is not to be limited excepting by the scope of the appended claims.

What is claimed is:

1. The method of fractionally distilling fluid mixtures in at least three stages, each stage comprising a fractionating zone in which a stream of vapors is contacted in counter-current with the stream of liquid condensed therefrom while after the first stage, apart from other fractions, at least twice, two side stream fractions are withdrawn from a fractionating zone at spaced levels intermediate two successive points at which fractions from the preceding stage are introduced.

2. The method of fractionally distilling composite fluids which comprises introducing fluid into a first fractionating zone, substantially completely separating the fluid into a plurality of fractions in said zone, withdrawing a plurality of said fractions from said zone and introducing them at different points into a second fractionating zone, withdrawing a plurality of intermediate fractions from the second fractionating zone between adjacent points at which the first mentioned fractions are introduced into the second zone, withdrawing an overhead and a bottoms fraction from the second zone, introducing said overhead and bottoms fractions and a plurality of said intermediate fractions into a third fractionating zone at spaced points thereof, and withdrawing a plurality of intermediate fractions from said third zone between adjacent points at which fractions from the second zone are introduced.

3. The method of fractionally distilling composite fluids which comprises introducing fluid into a first fractionating zone, substantially completely separating the fluid into a plurality of fractions in said zone, withdrawing a plurality of said fractions from said zone and introducing them at different points into a second fractionating zone, withdrawing two intermediate fractions from the second fractionating zone between adjacent points at which the first mentioned fractions are introduced into the second zone, introducing said intermediate fractions into a third fractionating zone at spaced points thereof, and withdrawing two intermediate fractions from said third zone between adjacent points at which said fractions from the second zone are introduced.

4. Apparatus for the fractional distillation of composite fluids comprising three fractionating towers, means for introducing fluid into the first tower, means for conducting fractions from the first tower to spaced points in the second tower, means for withdrawing a plurality of intermediate fractions from the second tower between adjacent points at which the fractions from the first tower are introduced, means for conducting said plurality of fractions from the second tower to spaced points in the third tower, and means for withdrawing a plurality of fractions from the third tower between adjacent points at which fractions are introduced into the third tower.

5. Apparatus for the fractional distillation of composite fluids comprising three fractionating towers, means for introducing fluid into the first tower, means for conducting fractions from the first tower to spaced points in the second tower, means for withdrawing two intermediate fractions from the second tower between adjacent points at which fractions from the first tower are introduced, means for withdrawing an overhead and a bottoms fraction from the second tower, means for delivering the overhead and bottoms fraction and said intermediate fractions to spaced points in the third tower, and means for withdrawing two fractions from the third tower between adjacent points at which fractions are introduced into the third tower.

6. The method of fractionally distilling composite fluids to produce in two fractionating zones, four fractions the constituents of which are substantially completely separated from each other, which comprises introducing fluid to be fractionated into a first fractionating zone at an intermediate point thereof above a stripping zone and below a rectifying zone, removing an overhead stream from the fractionating zone, condensing at least a portion of said stream and returning condensate to the upper part of the fractionating zone as reflux, vaporizing a portion of the reflux leaving the lower part of the fractionating zone to provide a stripping medium for said stripping zone, separately conducting the other portion of the overhead stream and the reflux leaving the lower portion of the fractionating zone to a second fractionating zone as first and second feed streams respectively, the constituents of said first and second feed streams being substantially completely separated from each other, introducing the first feed stream into the second fractionating zone at an intermediate point of its upper part above a stripping zone and below a rectifying zone therein, introducing the second feed stream into the second fractionating zone at an intermediate point of its lower part above a stripping zone and below a rectifying zone therein, the second fractionating zone having a heat transmitting and fractionating zone between the stripping zone of the upper part and the rectifying zone of the lower part which serves to transmit heat from the lower to the upper parts of the second fractionating zone, removing an overhead stream from the second fractionating zone, condensing at least a portion of said last mentioned stream and returning condensate to the upper part of the second fractionating zone as reflux, vaporizing a portion of the reflux leaving the lower part of the second fractionating zone to provide a stripping medium for the stripping zone in the lower part of the second fractionating zone, the other portion of the overhead stream constituting a first fraction, withdrawing a second intermediate fraction from the second fractionating zone at the base of the stripping zone of the upper part thereof, withdrawing a third intermediate fraction from the second fractionating zone at the top of the rectifying zone of the lower part thereof, the other portion of the reflux leaving the lower part of the second fractionating zone constituting a fourth fraction, the constituents of said first, second, third and fourth fractions being substantially completely separated from each other, and said heat transmitting and fractionating zone serving to maintain the separation between the constituents of the first and second feed streams effected in the first fractionating zone.

ANTOINE JOHAN BRUGMA.